United States Patent
Rife et al.

(10) Patent No.: US 10,556,560 B2
(45) Date of Patent: Feb. 11, 2020

(54) VEHICLE ROCKER GUARD WITH INTEGRATED PIVOTING STORABLE STEP

(71) Applicant: Ford Global Technologies, LLC, Dearborn, MI (US)

(72) Inventors: Dean Robert Rife, Shelby Township, MI (US); Travis S. Garland, Milford, MI (US); Mark Beilman, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 15/795,032

(22) Filed: Oct. 26, 2017

(65) Prior Publication Data
US 2019/0126870 A1  May 2, 2019

(51) Int. Cl.
| | | |
|---|---|---|
| B60R 3/02 | (2006.01) | |
| B60R 19/38 | (2006.01) | |
| B62D 25/02 | (2006.01) | |
| B60R 9/02 | (2006.01) | |
| B60R 3/00 | (2006.01) | |
| B60R 19/42 | (2006.01) | |

(52) U.S. Cl.
CPC .............. *B60R 19/38* (2013.01); *B60R 3/002* (2013.01); *B60R 3/02* (2013.01); *B60R 9/02* (2013.01); *B60R 19/42* (2013.01); *B62D 25/025* (2013.01)

(58) Field of Classification Search
CPC .............. B60R 3/00; B60R 3/02; B60R 3/002
USPC ......................................................... 280/166
See application file for complete search history.

(56) References Cited

U.S. PATENT DOCUMENTS

| | | | | |
|---|---|---|---|---|
| 3,517,942 A | * | 6/1970 | Cuffe | B60R 3/02 280/166 |
| 3,751,068 A | * | 8/1973 | Green | B60R 3/02 280/166 |
| 4,180,143 A | * | 12/1979 | Clugston | B60R 3/02 182/91 |
| 5,697,626 A | * | 12/1997 | McDaniel | B60R 3/02 182/91 |
| 5,732,996 A | * | 3/1998 | Graffy | B60R 3/02 280/166 |
| 6,435,534 B1 | * | 8/2002 | Stone | B60R 3/002 182/127 |
| 6,474,668 B2 | * | 11/2002 | Debo | B60R 3/02 280/166 |
| 6,588,783 B2 | * | 7/2003 | Fichter | B60R 3/00 280/163 |
| 6,663,125 B1 | * | 12/2003 | Cheng | B60R 3/02 280/166 |
| 6,685,204 B1 | * | 2/2004 | Hehr | B60R 3/02 280/164.1 |
| 6,726,230 B2 | * | 4/2004 | Weir | B60R 3/002 280/163 |

(Continued)

FOREIGN PATENT DOCUMENTS

WO   03/066380 A1   8/2003

*Primary Examiner* — Jeffrey J Restifo
(74) *Attorney, Agent, or Firm* — Vichit Chea; Carlson, Gaskey & Olds, P.C.

(57) ABSTRACT

A guard for a vehicle includes a support tube. A pivoting step includes a pivot tube portion movable about the support tube between a stowed position and a deployed position and a step portion. A spring member is disposed between the support tube and pivot tube biasing the pivot tube toward one of the stowed position and deployed position.

17 Claims, 5 Drawing Sheets

(56) References Cited

U.S. PATENT DOCUMENTS

| | | | | |
|---|---|---|---|---|
| 6,840,526 B2* | 1/2005 | Anderson | ............... | B60R 3/02 |
| | | | | 182/127 |
| 6,857,680 B2* | 2/2005 | Fielding | ............... | B60N 2/3015 |
| | | | | 280/166 |
| 7,434,825 B2* | 10/2008 | Williams | ............... | B60R 3/02 |
| | | | | 280/163 |
| 7,731,212 B2* | 6/2010 | Storer | ............... | B60R 3/00 |
| | | | | 280/163 |
| 7,976,042 B2* | 7/2011 | Watson | ............... | B60R 3/02 |
| | | | | 280/166 |
| 8,146,935 B1 | 4/2012 | Adams | | |
| 8,235,432 B2 | 8/2012 | Ryan et al. | | |
| 8,342,550 B2* | 1/2013 | Stickles | ............... | B60R 3/02 |
| | | | | 280/163 |
| 8,448,967 B2* | 5/2013 | Storer | ............... | B60R 3/002 |
| | | | | 280/163 |
| 8,833,781 B2* | 9/2014 | Hayes | ............... | B60R 3/02 |
| | | | | 280/163 |
| 8,985,606 B2* | 3/2015 | Fichter | ............... | B60R 3/00 |
| | | | | 280/163 |
| 9,333,919 B2* | 5/2016 | Crandall | ............... | B60Q 1/323 |
| 9,381,863 B2* | 7/2016 | Blackwell | ............... | B60R 3/007 |
| 9,481,308 B2* | 11/2016 | Dringenberg | ............... | B60R 3/02 |
| 9,725,041 B2* | 8/2017 | Rinaldi | ............... | B60R 3/02 |
| 9,771,024 B2* | 9/2017 | Hayes | ............... | B60R 3/02 |
| 2006/0091642 A1 | 5/2006 | Goldstein | | |
| 2015/0291116 A1 | 10/2015 | Pi | | |
| 2016/0288718 A1 | 10/2016 | Hayes et al. | | |

* cited by examiner

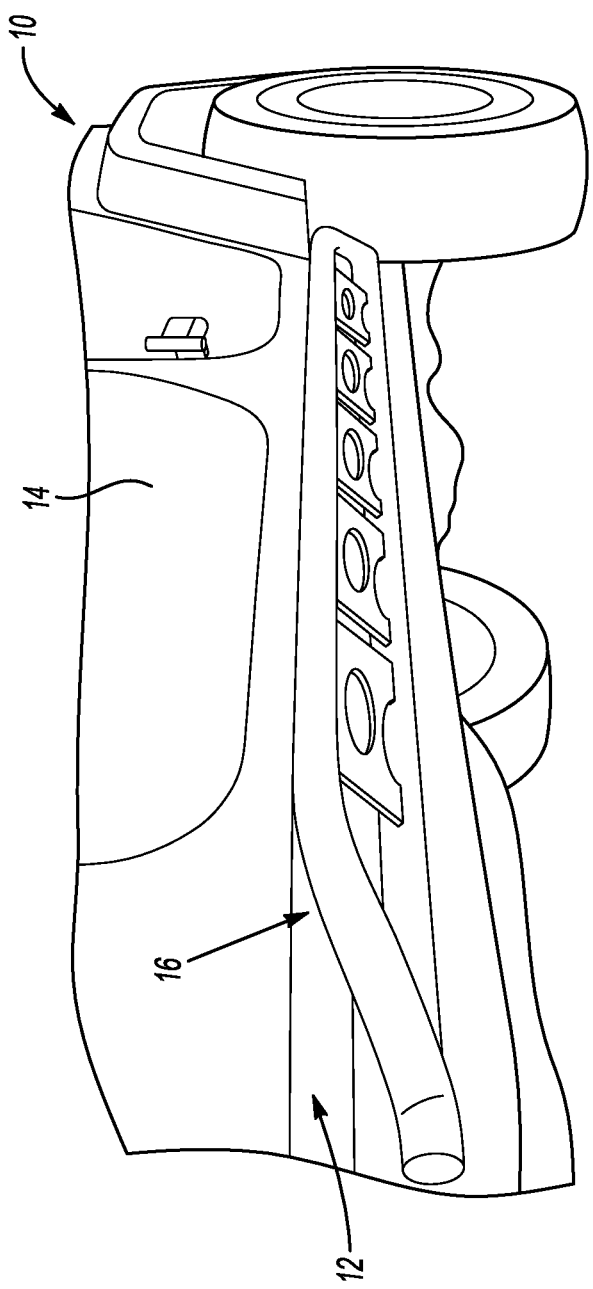
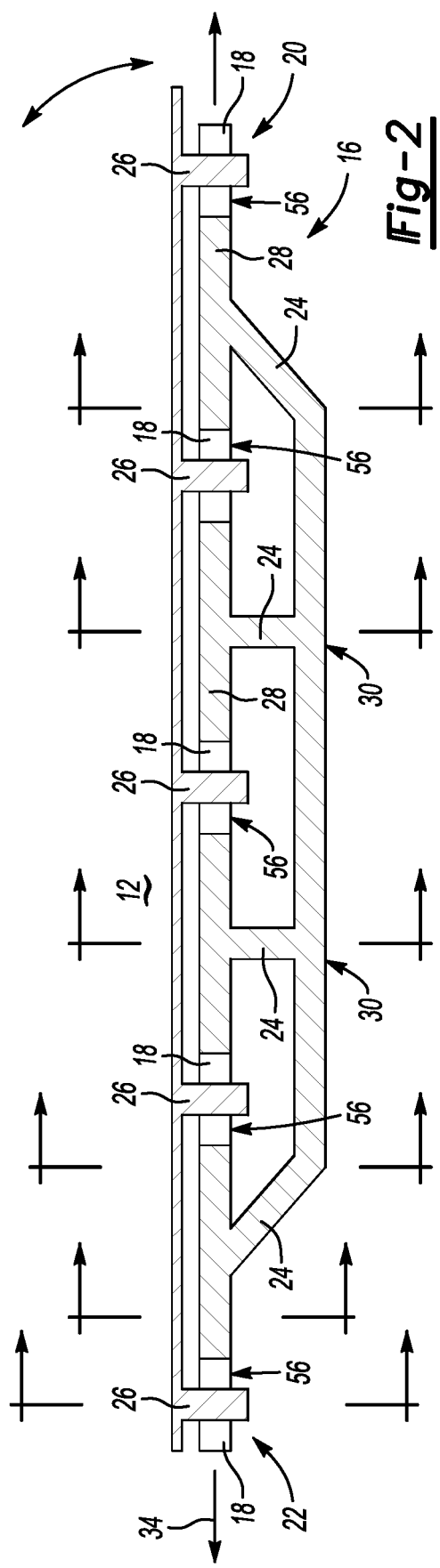

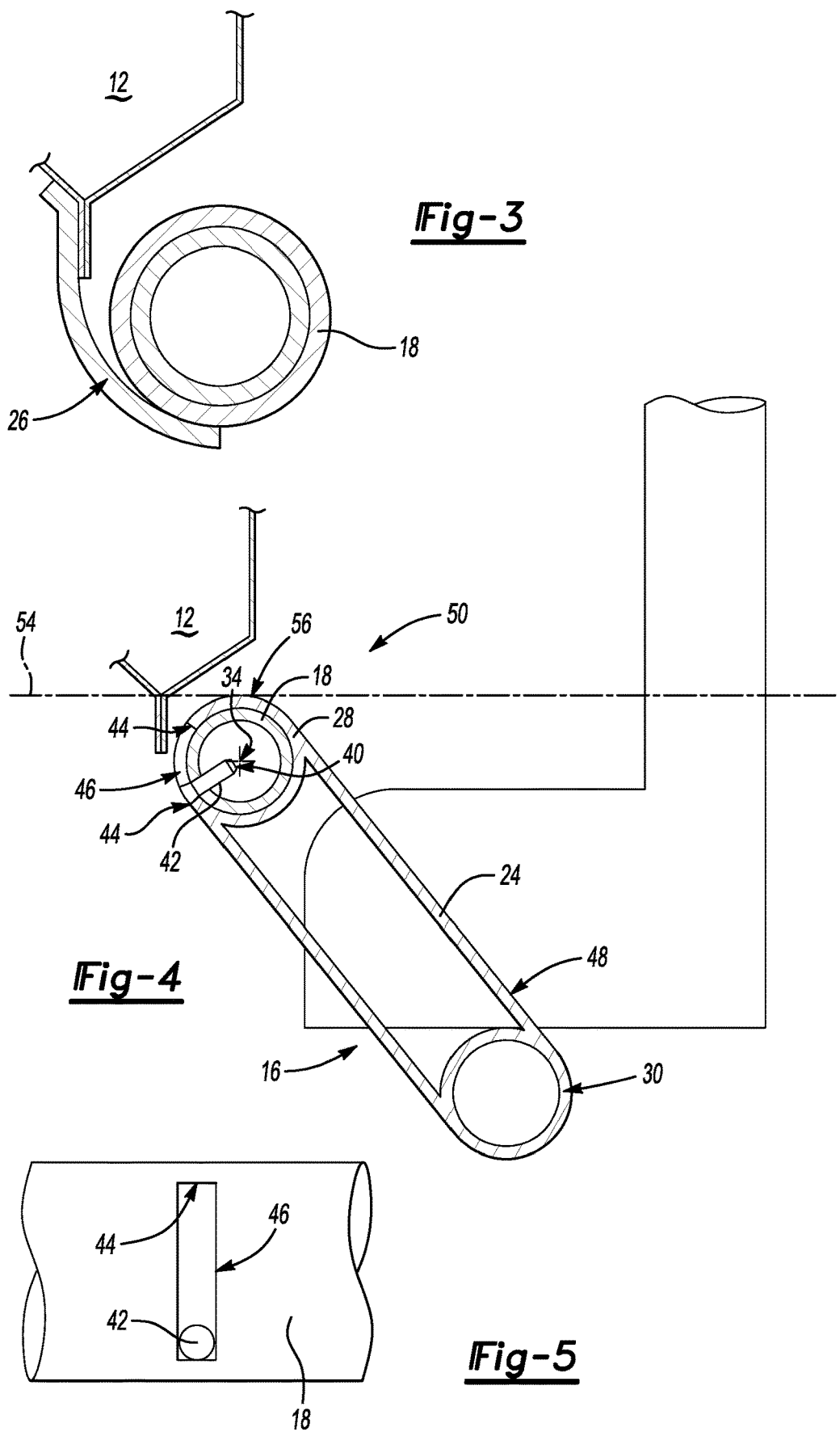

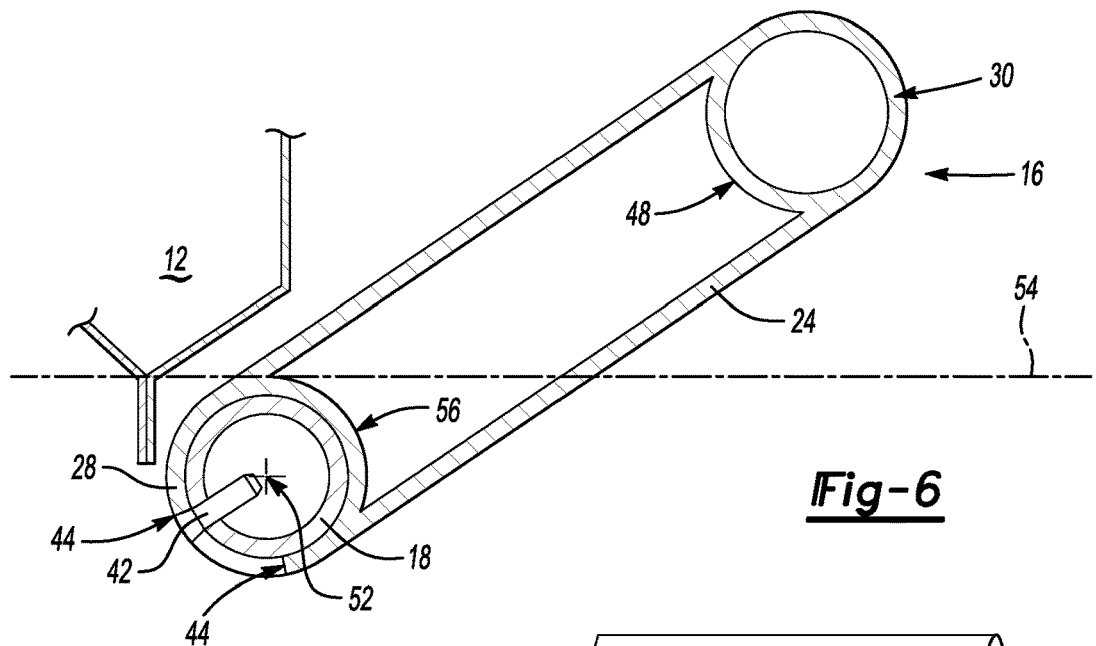
*Fig-6*
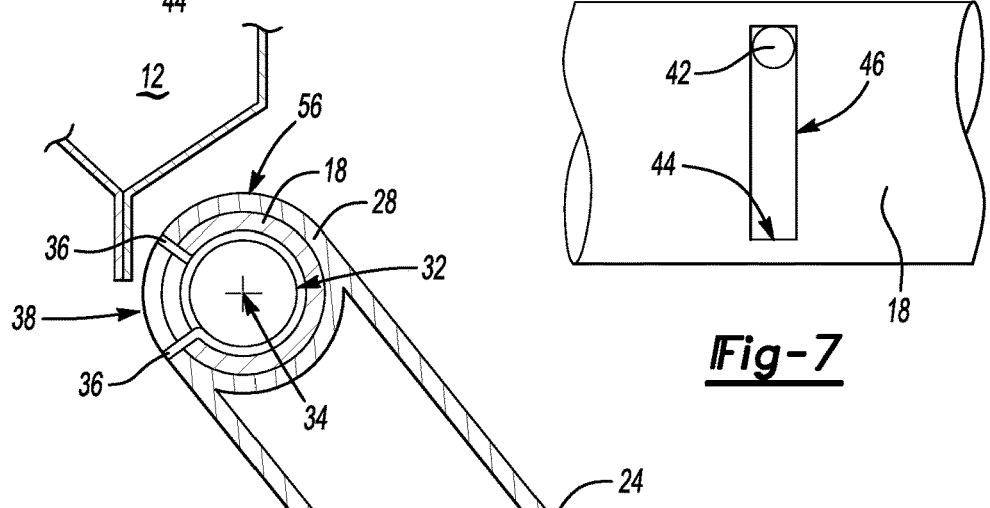
*Fig-7*
*Fig-8A*
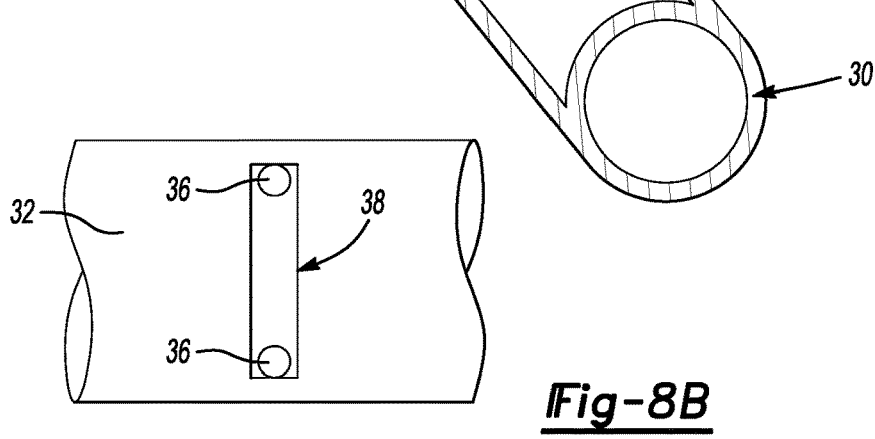
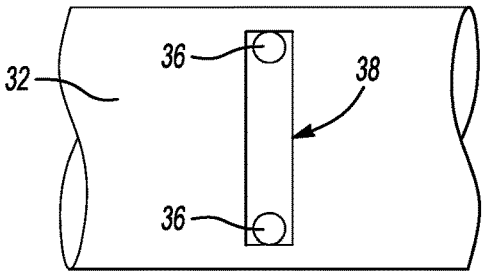
*Fig-8B*

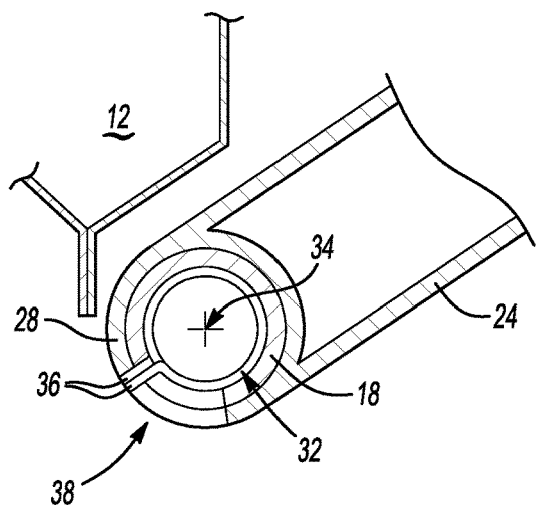
Fig-9A
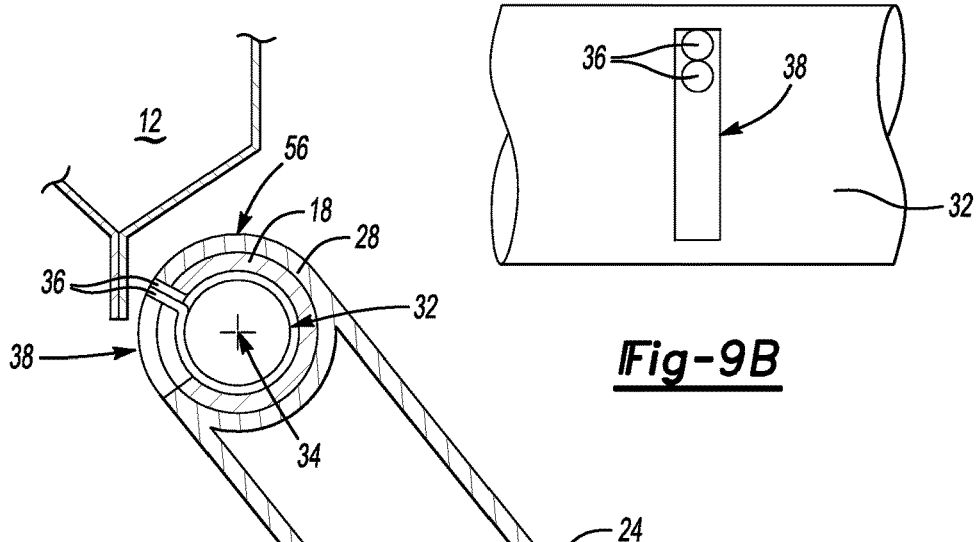
Fig-9B
Fig-10
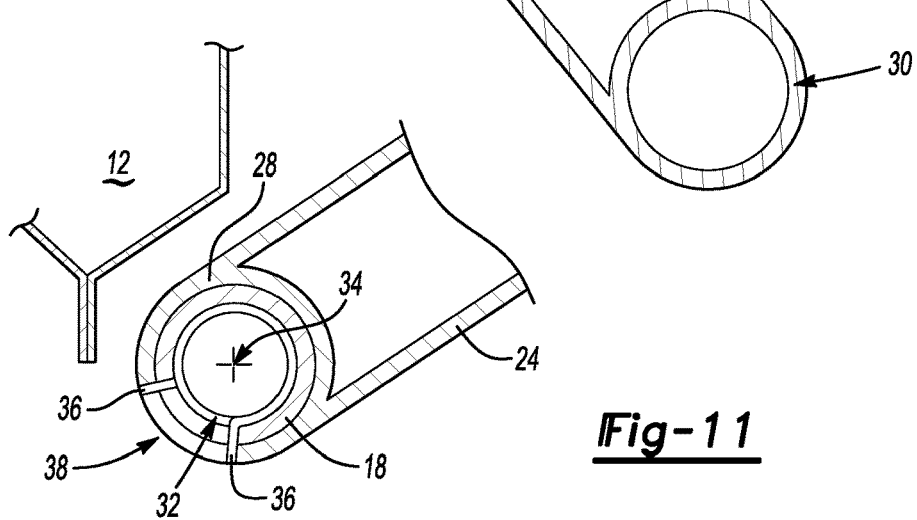
Fig-11

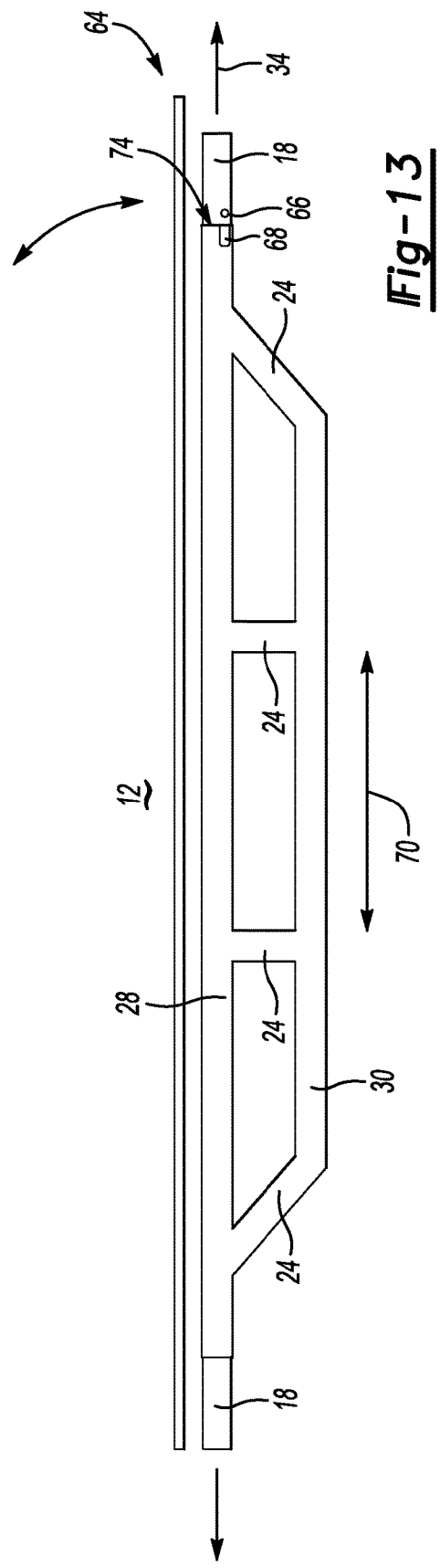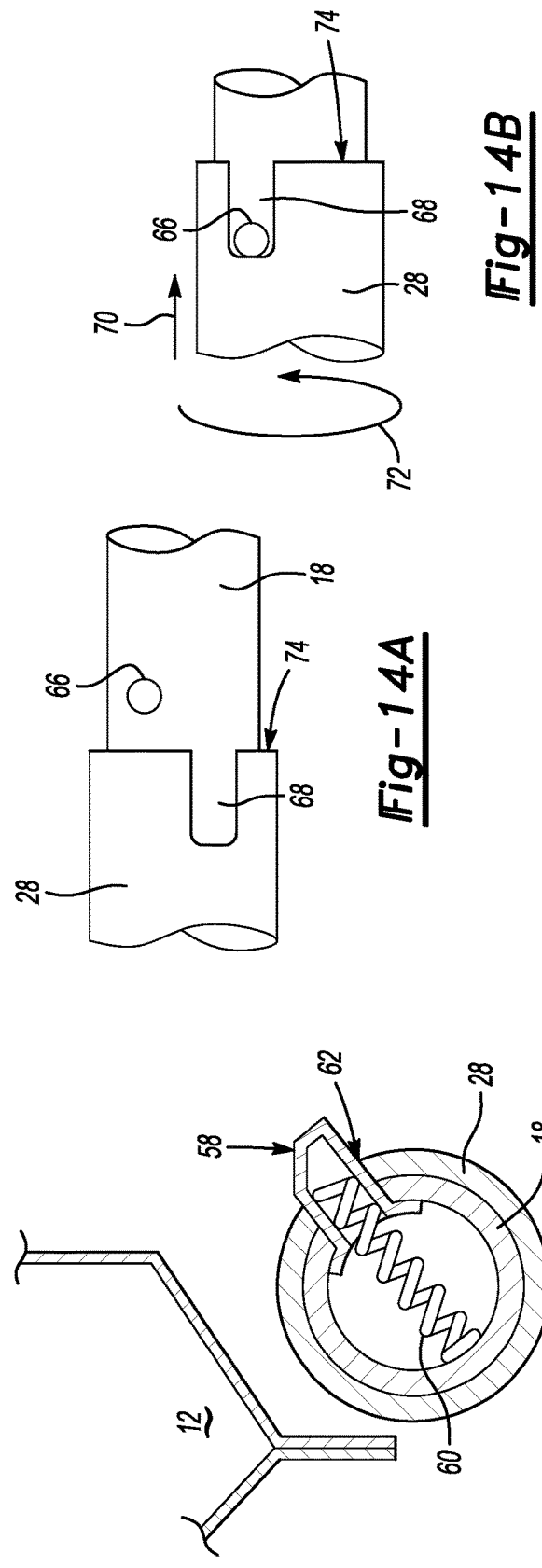

VEHICLE ROCKER GUARD WITH INTEGRATED PIVOTING STORABLE STEP

TECHNICAL FIELD

This disclosure relates to a guard and step for protecting a lower body side panel of a motor vehicle.

BACKGROUND

Vehicles intended and designed for operation off-road often include features for protecting parts of the vehicle from damage. Guards are mounted on the vehicle to protect critical parts such as engine components and other easily damaged structures. Moreover, guards may be mounted on the front and sides of the vehicle to protect the body from damage. Additionally, vehicles intended for off-road use often include an increased ground clearance. Steps and running boards may be included to aid entry and exit of the raised vehicle. However, such steps and running boards can detract from the look of the vehicle and also may extend downward sufficiently to decrease the overall vehicle ground clearance.

SUMMARY

A guard for a vehicle according to an exemplary aspect of the present disclosure includes, among other things, a support tube. A pivoting step includes a pivot tube portion movable about the support tube between a stowed position and a deployed position and a step portion. A spring member is disposed between the support tube and pivot tube biasing the pivot tube toward one of the stowed position and deployed position.

In a further non-limiting embodiment of the foregoing guard, the support tube and pivot tube portion include round tubes with the pivot tube supported for rotation on an outer circumference of the support tube.

In a further non-limiting embodiment of any of the foregoing guards, the step portion includes one of a round tube, an oval tube and a rectilinear tube in cross-section extending outward from the pivot tube portion In a further non-limiting embodiment of any of the foregoing guards, at least one stop pin extends outward from the support tube to limit rotation of the pivot tube portion between the stowed and deployed positions.

In a further non-limiting embodiment of any of the foregoing guards, the support tube includes distal ends that extend past ends of the pivot tube portion. The distal ends are secured to attachment brackets secured to the motor vehicle.

In a further non-limiting embodiment of any of the foregoing guards, the pivot tube includes gaps where the support tube is exposed, and the support tube is attached to at least one attachment bracket within the gaps.

In a further non-limiting embodiment of any of the foregoing guards, the stowed position includes the step portion angled upward above a horizontal plane extending through the support tube and the deployed position includes the step angled downward below the horizontal plane.

In a further non-limiting embodiment of any of the foregoing guards, the biasing member biases the step toward the stowed position.

In a further non-limiting embodiment of any of the foregoing guards, the biasing member biases the step toward the deployed position.

In a further non-limiting embodiment of any of the foregoing guards, the pivoting step extends upwardly past a portion of a lower body panel of the vehicle in the stowed position.

In a further non-limiting embodiment of any of the foregoing guards, a latch secures the pivoting step in one of the stowed and deployed positions.

In a further non-limiting embodiment of any of the foregoing guards, the latch includes a movable member biased outward by a latch spring.

In a further non-limiting embodiment of any of the foregoing guards, the pivot tube portion is slidable longitudinally along the support tube and the latch includes a slot at an end of the pivot tube portion engageable with a fixed tab on the support tube.

In a further non-limiting embodiment of any of the foregoing guards, the step portion includes a rectilinear part.

In a further non-limiting embodiment of any of the foregoing guards, the pivoting step is mounted proximate a lower side panel of the motor vehicle.

A lower side panel guard for a vehicle according to another exemplary aspect of the present disclosure include, among other things, a support tube attached below a lower side panel of a vehicle. A pivoting step includes a pivot tube portion supported for rotation on an outer surface of the support tube and a step portion. The pivoting step is movable between a stowed position where the step portion extends above the support tube and a deployed position where the step portion extends below the support tube. A biasing member is disposed between the support tube and pivot tube biasing the pivot tube toward one of the stowed position and deployed position. A latch secures the pivoting step in one of the stowed and deployed positions.

In a further non-limiting embodiment of the foregoing guard, at least one stop pin extends outward from the support tube to limit rotation of the pivot tube portion between the stowed and deployed positions.

In a further non-limiting embodiment of any of the foregoing guards, the support tube includes distal ends that extend past ends of the pivot tube portion. The distal ends are secured to attachment brackets secured to the motor vehicle.

In a further non-limiting embodiment of any of the foregoing guards, the latch includes a movable member biased outward by a latch spring.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 1 is a schematic view of an example vehicle including a guard assembly.

FIG. 2 is a schematic view of an example guard assembly embodiment.

FIG. 3 is a cross-sectional view through a portion of the guard assembly.

FIG. 4 is a cross-sectional view through a portion of the guard assembly in a deployed position.

FIG. 5 is a schematic side view of a portion of the guard assembly.

FIG. 6 is a cross-sectional view of a portion of the guard assembly in a stowed position.

FIG. 7 is a schematic side view of a portion of the guard assembly in the stowed position.

FIG. 8A is a cross-sectional view of a portion of the guard assembly with a biasing spring in the deployed position.

FIG. 8B is a schematic side view of a portion of the guard assembly including the spring.

FIG. 9A is a cross-sectional view of a portion of the guard assembly in the stowed position.

FIG. 9B is a schematic side view of a portion of the guard assembly in the stowed position.

FIG. 10 is another embodiment of the example guard assembly in the deployed position.

FIG. 11 is a cross-sectional view of the guard assembly in the stowed position.

FIG. 12 is a cross-sectional view of the guard assembly with a latch.

FIG. 13 is a schematic view of another guard assembly embodiment.

FIG. 14A is a schematic view of a portion of the guard assembly in the deployed position.

FIG. 14B is a schematic view of a portion of the guard assembly in a stowed position.

DETAILED DESCRIPTION

This disclosure details a guard assembly for a motor vehicle that is movable to provide a step to aid entry and exit. These and other features are discussed in greater detail in the following paragraphs of this detailed description.

Although a specific component relationship is illustrated in the figures of this disclosure, the illustrations are not intended to limit this disclosure. In other words, the placement and orientation of the various components are shown schematically and could vary within the scope of this disclosure. In addition, the various figures accompanying this disclosure are not necessarily to scale, and some features may be exaggerated or minimized to show certain details of a particular component.

Referring to FIG. 1, an example motor vehicle includes a door 14 that is disposed above and adjacent lower body side panel 12. The lower body side panel 12 is susceptible to damage especially for vehicles that are intended for off road use. The disclosed example vehicle 10 includes a guard assembly 16 that is movable between a stowed position as illustrated in FIG. 1 and a deployed position. In the stowed position, the guard 16 protects the lower body side panel 12 disposed along a bottom portion of the motor vehicle. Although a lower side panel 12 is shown and disclosed by way of example, it is within the contemplation of this disclosure that the guard assembly 16 may be utilized to protect rocker panels and any other panel proximate a lower portion of the vehicle.

Referring to FIGS. 2 and 3 with continued reference to FIG. 1, the example guard assembly 16 includes a support tube 18 that is rigidly attached to a frame or other static feature of the vehicle 12 by brackets 26. The support tube 18 is rigidly supported at spaced apart location along the length of the guard assembly 16 by a corresponding bracket 26 and does not rotate.

In the disclosed example, the support tube 18 is round and includes an outer surface 56 about which is supported a pivot tube portion 28. The pivot tube portion 28 is disposed about the outer surface 56 of the support tube 18 and comprises spaced apart segments extending along the length of the support tube 18. The pivot tube portion 28 is of a total combined length that is shorter than the support tube 18 such that ends 20 and 22 of the support tube 18 extend outwardly along axis 34. The pivot tube portion 28 is rotatable about the axis 34 defined through the support tube 18 such that the guard assembly 16 is movable from a stowed position to a deployed position.

The guard assembly 16 includes a step portion 30 that extends outwardly from the pivot tube portion 28 and provides a step to aid entry and exit from the motor vehicle 10. Intermediate portions 24 are disposed between the pivot tube portion 28 and the step portion 30 and space the step portion 30 apart from the pivot tube portion 28. The number and orientation of the intermediate portions 24 may vary depending on a length of the guard assembly 16. The guard assembly 16 may be utilized often on vehicles intended for off road use. Such vehicles may include an elevated or increased ground clearance. A step therefore becomes advantageous to aid in entering and exiting the vehicle. The example guard assembly 16 is movable to a deployed position to function as a step.

Referring to FIGS. 4 and 5 with continued reference to FIG. 2, a cross-section of the guard assembly 16 is illustrated in the deployed position 50. In the deployed position 50, the pivot tube portion 28 is engaged or stopped at a position below a horizontal plane 54. In this example, the horizontal plane 54 is disposed along a top surface 48 of the support tube 18. The pivot tube portion 28 includes a slot 46 within which is disposed a stop pin 40. The stop pin 40 is fixed to the support tube 18 within an opening 42. Rotation of the pivot tube 28 about the support tube 18 is enabled by the slot 46. The ends of the slot 46 provide stops 44 that engage the support pin 40 and maintain the step portion 30 at the desired angle relative to the horizontal plane 54. It should be understood that the length of the slot 46 will be provided and tailored to the angle the step portion 30 into the desired position below the horizontal plane 54. The step portion 30 includes a surface 48 that is intended for use as a step into and out of the vehicle.

Referring to FIGS. 6 and 7, the example guard assembly 16 is shown in a stowed position indicated at 52 where the step portion 30 is rotated about the pivot axis 34 such that the step surface 48 is substantially above the horizontal plane 54. In the stowed position 52, the pivot tube portion 28 is rotated such that the stop pin 42 is engaged to a second end 44 of the slot 46 and maintained in the stowed position 52.

Referring to FIGS. 8A and 8B, a spring 32 is provided between the fixed support tube 18 and the pivot tube 28. The spring 32 includes spring ends 36 that are disposed within slot 38 that is formed within both the support tube 18 and the pivot tube portion 28. The spring 32 is shown in a non-compressed condition in FIG. 8A such that the guard assembly 16 is biased toward the deployed position.

Referring to FIGS. 9A and 9B, the guard assembly 16 is shown in the stowed position. In the stowed position, the spring 32 is compressed such that both ends 36 are in contact with a common side of the slot 38. In this position, the spring 32 exerts a bias force in a direction away from the stowed position toward the deployed position shown in FIG. 8A.

Referring to FIGS. 10 and 11, in another disclosed example embodiment, the spring 32 is arranged within the slot 38 to bias the guard assembly 16 toward the stowed position (FIG. 11). Accordingly, the default position of the guard assembly 16 illustrated in FIGS. 10 and 11 is in the stowed position. Accordingly, an operator can step on the step portion 30 to cause rotation about the axis 34 to the deployed position and enter the vehicle. Once the operator is in the vehicle and the weight of the operator released from the step portion 30, the spring 32 will move the guard assembly 16 to the stowed position as shown in FIG. 11 without any action from the operator. The guard assembly 16 is held in the stowed position by the spring 32. The spring ends 36 illustrate a non-compressed state of the spring 32 when in the stowed position shown in FIG. 11. FIG. 10 illustrates the spring 32 in a compressed state with both spring ends 36 at a common side of the slot 38. The spring 32 will move to the non-compressed state shown in FIG. 11 when the external force applied by the weight of the operator is removed.

Accordingly, the disclosed guard assembly 16 can be configured to provide a normal default position in either the deployed position as shown in FIG. 8A or the stowed position as is shown in FIG. 11. Moreover, although a coil spring is disclosed by way of example, other biasing members could be utilized to provide the desired biasing force and are within the contemplation of this disclosure.

Referring to FIG. 12, another section of the guard assembly 16 is illustrated and includes a latch 58 that is biased outwardly by a latch spring 60. The latch 58 extends through an opening 62 in the outer pivot tube 28 to hold the outer pivot tube 28 in a circumferential position about the support tube 18. The example latch 58 can be depressed to enable rotation of the pivot tube 28 thereby repositioning of the entire guard assembly 16 and step portion 30. Moreover, the latch 58 may be manually released to keep the guard assembly 16 in one of the stowed and deployed positions depending on the specific embodiment and desired orientation of the step portion 30.

Referring to FIGS. 13, 14A and 14B, another example guard assembly 64 is shown and is rotatable about a pivot axis 34 and the support tube 18. In this example, the guard assembly 64 is slidable in a direction indicated by arrow 70 such that an end portion 74 of the pivot tube portion 28 can engage a pin 66 to maintain a specific orientation and position of the step portion 30.

Referring to FIG. 14A, a pin 66 is fixed to the support tube 18 and is disposed near the end portion 74 of the pivot tube 28. The end portion 74 includes a slot 68. Rotation indicated by arrow 72 of the pivot tube 28 about the axis 34 to one of the deployed or stowed positions followed by sliding in a direction indicated by arrow 70 will move the slot 60 to engage the pin 66 that will maintain the position of the step portion 30 of the guard assembly 64. In this example the pin 66 and slot 68 are arranged to secure the guard assembly 16 in the stowed position. However, the pin 66 and slot 68 could be arranged to hold the guard assembly 16 in the deployed position and/or any position between the stowed and deployed positions. Moreover, more than one slot 68 could be provided to enable securement of the guard assembly 16 in any of a number of preset positions about the axis 34. The pin and slot feature provides another latch that positively maintains an orientation and position of the guard assembly 64 during vehicle operation.

Accordingly, the example guard assembly includes features that enable rotation between a deployed and stowed position to provide a convenient step for use and entry and exit of a vehicle while also providing a desired protection for side body panels of the vehicle.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A guard for a vehicle comprising:
 a support tube;
 a pivoting step including a pivot tube portion movable about the support tube between a stowed position and a deployed position and a step portion, wherein the support tube and pivot tube portion comprise round tubes with the pivot tube supported for rotation on an outer circumference of the support tube; and
 a spring member disposed between the support tube and pivot tube biasing the pivot tube toward one of the stowed position and deployed position.

2. The guard as recited in claim 1, wherein the step portion comprises one of a round tube, an oval tube and a rectilinear tube in cross-section extending outward from the pivot tube portion.

3. The guard as recited in claim 1, including at least one stop pin extending outward from the support tube to limit rotation of the pivot tube portion between the stowed and deployed positions.

4. The guard as recited in claim 1, wherein the support tube includes distal ends that extend past ends of the pivot tube portion, the distal ends secured to attachment brackets secured to the motor vehicle.

5. The guard as recited in claim 4, wherein the pivot tube includes gaps where the support tube is exposed, and the support tube is attached to at least one attachment bracket within the gaps.

6. The guard as recited in claim 1, wherein the stowed position includes the step portion angled upward above a horizontal plane extending through the support tube and the deployed position includes the step angled downward below the horizontal plane.

7. The guard as recited in claim 6, wherein the spring member biases the step toward the stowed position.

8. The guard as recited in claim 6, wherein the spring member biases the step toward the deployed position.

9. The guard as recited in claim 6, wherein the pivoting step extends upwardly past a portion of a lower body panel of the vehicle in the stowed position.

10. The guard as recited in claim 1, wherein the pivoting step is mounted proximate a lower side panel of the motor vehicle.

11. The guard as recited in claim 1, wherein the support tube includes a continuous length between a first end and a second end and the step portion is shorter than the continuous length of the support tube.

12. A guard for a vehicle comprising:
 a support tube;
 a pivoting step including a pivot tube portion movable about the support tube between a stowed position and a deployed position and a step portion, the support tube including distal ends that extend past ends of the pivot tube portion, the distal ends secured to attachment brackets secured to the motor vehicle, wherein the pivot tube includes gaps where the support tube is exposed, and the support tube is attached to at least one attachment bracket within the gaps; and a spring member disposed between the support tube and pivot tube biasing the pivot tube toward one of the stowed position and the deployed position.

13. The guard as recited in claim 12, wherein the support tube and pivot tube portion comprise round tubes with the pivot tube supported for rotation on an outer circumference of the support tube.

14. The guard as recited in claim 12, wherein the step portion comprises one of a round tube, an oval tube and a rectilinear tube in cross-section extending outward from the pivot tube portion.

15. The guard as recited in claim 12, including at least one stop pin extending outward from the support tube to limit rotation of the pivot tube portion between the stowed and deployed positions.

16. The guard as recited in claim 15, wherein the pivoting step extends upwardly past a portion of a lower body panel of the vehicle in the stowed position.

17. The guard as recited in claim 12, wherein the stowed position includes the step portion angled upward above a horizontal plane extending through the support tube and the deployed position includes the step angled downward below the horizontal plane.

* * * * *